United States Patent Office 3,431,927
Patented Mar. 11, 1969

3,431,927
METHOD FOR INCREASING THE PERMISSIBLE FLOW VELOCITY OF A LIQUID FLOWING ON A METAL SURFACE
Malte Kurt Einar Mattsson, Vasteras, Sweden, assignor to Aktiebolaget Svenska Metallverken, Vasteras, Sweden, a Swedish joint stock-company limited
No Drawing. Filed Dec. 17, 1965, Ser. No. 514,671
Claims priority, application Sweden, Dec. 22, 1964, 15,555/64
U.S. Cl. 137—1                              6 Claims
Int. Cl. F15d 1/06; C23f 11/08

ABSTRACT OF THE DISCLOSURE

A method for increasing the permissible flow velocity of a liquid impinging upon a metal surface of copper, aluminum or alloys thereof, by adding a solubilized hydrogen gas to the liquid at a hydrogen gas partial pressure of 0.1–10 atmospheres.

---

In structures employing flowing water it is normally necessary to restrict the flow velocity to a certain maximum value characteristic for the metal used in said structure. If this maximum value is exceeded, a risk of erosion corrosion (impingement attack) arises. The following maximum values are those conventional for the most common materials used in water systems and heat exchangers:

|  | M./S. |
|---|---|
| Copper | 1.5 |
| Admiralty brass | 2–2.5 |
| Aluminum brass | 3–3.5 |
| Copper nickel, 90/10 | 3.5 |
| Copper nickel, 70/30 | 4.5 |

The maximum permitted flow velocity imposes a limit on the capacity of the arrangement, which limit is in many cases of great technical and economic significance. This is so in heat exchangers, for example, where with respect to manufacturing costs, capacity and required space a high flow rate is desirable.

Another example is in the electromechanical fields. In certain electrical machines, cooling of the electrical copper lines is effected by passing deionized water through the lines. In this instance, the maximum permitted flow velocity for copper, 1.5 m./s., is such a serious restriction that it has retarded the technical developments in this field.

According to the present invention the maximum permitted flow velocity of an aqueous solution impinging upon a metallic surface can be appreciably increased by adding solubilized hydrogen gas to the solution flowing over said surface. As a consequence, the corrosion processes are counteracted or rendered impossible and the flow velocity can be increased to a value where a purely mechanical erosion process occurs. This limit is considerably higher than the limit for erosion corrosion (impingement attack). In the case of copper, for example, it is as high as approximately 8 m./s.

Even a very low content of hydrogen gas in the water, corresponding to a hydrogen-gas partial pressure of $10^{-6}$ atm. is sufficient to produce a favorable effect. The upper limit for the hydrogen gas content is determined by the ability of the mechanical structure to resist pressure. From the point of view of corrosion, the higher the content of hydrogen gas the better the effect. For example a hydrogen-gas partial pressure of $10^6$ atm. would be possible if the apparatus can be built to withstand this pressure. The general range of preferred operation is at hydrogen partial pressures of between 0.1 and 10 atm. However, as a rule it is often more simple to employ a hydrogen gas content corresponding to a hydrogen gas partial pressure of 1 atm. This content can be easily obtained by percolating hydrogen gas through the aqueous solution at atmospheric pressure.

The invention can be applied throughout the complete temperature range in which the water retains its liquid form.

Example 1

A heat exchanger having aluminum brass tubes is used with sea water as a cooling medium. At the intake the water is allowed to pass a device where hydrogen gas is dissolved in said water. The hydrogen gas is introduced into the water through a fine mesh-gas distribution filter. The amount of hydrogen gas injected corresponds to approximately 100 l. (NTP) per m.$^3$ water. Of this amount only approximately 1/10 of the gas is dissolved in the water. The remainder of the gas is collected and separated together with the oxygen which the hydrogen gas absorbs in its passage through the water. The gaseous mixture is passed over a platinum catalyst at a somewhat elevated temperature. A chemical combination between the oxygen and corresponding amount of hydrogen occurs during the formation of water; the remaining amount of hydrogen gas is re-used in the treating process. Due to the fact that the hydrogen gas is recirculated, the amount of hydrogen gas consumed can be kept within 30 l. (NTP) per m.$^3$ water. The cooling water thus treated with hydrogen gas is allowed to flow through the heat exchanger in the usual manner. Due to the hydrogen gas treatment, however, the flow velocity can be maintained as high as 6 m./s. against approximately 3 m./s. at normal operations where no gas has been added to the solution. Doubling the flow velocity means that the amount of heat transferred ($\alpha$-value) is also practically doubled, and that the capacity of the heat exchanger is also increased approximately two-fold.

Example 2

The electrical lines in an electrical apparatus are hollow and cooled by through flowing water which in order to restrict the electrolytic decomposition of the water in the electric field of the apparatus, must be deionized. The cooling water moves in a closed circuit in which is included a heat exchanger situated outside said electrical apparatus. The water is cooled in the heat exchanger. In connection therewith, hydrogen gas is injected through a gas distributing filter so that fine gas bubbles come into contact with the water. A gas trap prevents the excess of injected hydrogen gas from escaping. The gas trap is so constructed that the bubbles of hydrogen gas in water attain a pressure which exceeds 1 atm. only by an insignificant amount. Prior to the entry of the water in the electrical apparatus the accompanying hydrogen gas bubbles are separated by allowing the water to pass a vertically positioned cylindrical container with a degassing valve situated at the upper end surface. Due to the addition of hydrogen gas the plant can be operated with a flow velocity of water as high as approximately 4 m./s. Without the addition of hydrogen gas it would only have been possible to work with the maximum velocity, conventionally described, namely 1.5 m./s.

What is claimed is:

1. A method comprising increasing the permissible flow velocity of water or an aqueous solution impinging on metallic surfaces of copper, aluminum or their alloys, without producing erosion corrosion, by the addition of solubilized hydrogen gas to the liquid at a hydrogen gas partial pressure of 0.1–10 atm.

2. A method as claimed in claim 1 wherein the hydrogen gas partial pressure is about 1 atm.

3. A method as claimed in claim 1 wherein the metallic surfaces are included in a closed circuit.

4. A method as claimed in claim 1 wherein the metallic surfaces are cooling surfaces in an electrical apparatus.

5. A method as claimed in claim 1 wherein the oxygen in the liquid is released by reaction with the hydrogen gas in the presence of a platinum catalyst.

6. A method as claimed in claim 1 wherein the hydrogen is added to the liquid in the ratio of 100 l. per m.³.

References Cited

UNITED STATES PATENTS

| 1,949,631 | 3/1934 | Russell | 208—47 |
| 2,938,851 | 5/1960 | Stedman | 208—47 |
| 3,136,325 | 6/1964 | Mattix | 137—3 |

FOREIGN PATENTS

| 753,611 | 7/1956 | Great Britain. |

ALAN COHAN, *Primary Examiner.*